United States Patent
Jung et al.

(10) Patent No.: US 9,692,094 B2
(45) Date of Patent: Jun. 27, 2017

(54) HEAT SINK HAVING TWO OR MORE SEPARATED CHANNELS ARRANGED VERTICALLY WITH COMMON INLET AND COMMON OUTLET

(71) Applicant: LG CHEM, LTD., Seoul (KR)

(72) Inventors: Seung-Hun Jung, Daejeon (KR); Min-Jung Kim, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/651,745

(22) PCT Filed: Oct. 17, 2014

(86) PCT No.: PCT/KR2014/009787
§ 371 (c)(1),
(2) Date: Jun. 12, 2015

(87) PCT Pub. No.: WO2015/057014
PCT Pub. Date: Apr. 23, 2015

(65) Prior Publication Data
US 2015/0303537 A1    Oct. 22, 2015

(30) Foreign Application Priority Data

Oct. 18, 2013 (KR) .................. 10-2013-0124716
Oct. 16, 2014 (KR) .................. 10-2014-0140059

(51) Int. Cl.
*H01M 10/613* (2014.01)
*H01M 10/617* (2014.01)
(Continued)

(52) U.S. Cl.
CPC ......... *H01M 10/6556* (2015.04); *F28F 3/12* (2013.01); *H01M 2/1016* (2013.01);
(Continued)

(58) Field of Classification Search
CPC .... H01M 10/42; H01M 10/60–10/627; H01M 10/65–10/6568; H01M 10/66–10/667
See application file for complete search history.

(56) References Cited

U.S. PATENT DOCUMENTS 5,678,760 A * 10/1997 Muso .................. B60K 11/02
165/41
2002/0012833 A1 * 1/2002 Gow .................. H01M 2/0242
429/120
(Continued)

FOREIGN PATENT DOCUMENTS

DE    102011086246 A1    5/2013
JP    8-139478 A    1/2001
(Continued)

OTHER PUBLICATIONS

Machine Translation of Terada et al. JP 2013-037869 (Feb. 21, 2013).*
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

The present disclosure discloses a heat sink with two or more separated channels. The heat sink according to the present disclosure includes a cooling channel through which a refrigerant passes to cool a secondary battery by an indirect cooling method, the secondary battery including a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively, wherein the cooling channel has two or more separated (Continued)

channels, the two or more separated channels have branches inside to allow a coolant to flow in each of the channels, and the branches are vertically arranged. According to the present disclosure, provision of a heat sink having a uniform cooling effect is enabled.

7 Claims, 7 Drawing Sheets

(51) Int. Cl.
*H01M 10/6556* (2014.01)
*H01M 10/647* (2014.01)
*H01M 10/6566* (2014.01)
*F28F 3/12* (2006.01)
*H01M 2/10* (2006.01)
*F28D 21/00* (2006.01)

(52) U.S. Cl.
CPC ....... *H01M 10/613* (2015.04); *H01M 10/617* (2015.04); *H01M 10/647* (2015.04); *H01M 10/6566* (2015.04); *F28D 2021/0029* (2013.01); *H01M 2/10* (2013.01)

(56) References Cited

U.S. PATENT DOCUMENTS

| | | | |
|---|---|---|---|
| 2006/0090492 A1 | 5/2006 | Ahn et al. | |
| 2006/0214641 A1* | 9/2006 | Cho | H01M 10/4207 320/150 |
| 2010/0151299 A1* | 6/2010 | Ha | H01M 2/1077 429/61 |
| 2012/0148889 A1* | 6/2012 | Fuhr | H01M 2/1077 429/87 |
| 2013/0040175 A1 | 2/2013 | Yang et al. | |
| 2013/0143093 A1 | 6/2013 | Teng et al. | |
| 2013/0189557 A1 | 7/2013 | Haussmann | |
| 2014/0295228 A1 | 10/2014 | Yan et al. | |
| 2014/0335390 A1 | 11/2014 | Hwang et al. | |

FOREIGN PATENT DOCUMENTS

| | | | | |
|---|---|---|---|---|
| JP | 2001-24126 A | 1/2001 | | |
| JP | 2005-26219 A | 1/2005 | | |
| JP | 2013-37869 A | 2/2013 | | |
| JP | 2013-101926 A | 5/2013 | | |
| KR | 10-2006-0036694 A | 5/2006 | | |
| KR | 10-2012-0054770 A | 5/2012 | | |
| KR | 10-1205181 B1 | 11/2012 | | |
| KR | 10-2013-0062056 A | 6/2013 | | |
| KR | 10-1293971 B1 | 8/2013 | | |
| KR | 10-2013-0104660 A | 9/2013 | | |
| WO | WO 2011116959 A2 * | 9/2011 | ............ | B60L 3/0046 |
| WO | WO 2013-139905 A1 * | 3/2013 | ............ | H01M 10/50 |

OTHER PUBLICATIONS

International Search Report, issued in PCT/KR2014/009787, mailed Jan. 27, 2015.
Written Opinion of the International Searching Authority, issued in PCT/KR2014/009787, mailed Jan. 27, 2015 with translation.

* cited by examiner

HEAT SINK HAVING TWO OR MORE SEPARATED CHANNELS ARRANGED VERTICALLY WITH COMMON INLET AND COMMON OUTLET

TECHNICAL FIELD

The present disclosure relates to a heat sink, and more particularly, to a heat sink having two or more separated channels arranged vertically with a common inlet and a common outlet.

The present application claims priority to Korean Patent Application No. 10-2013-0124716 filed in the Republic of Korea on Oct. 18, 2013 and Korean Patent Application No. 10-2014-0140059 filed in the Republic of Korea on Oct. 16, 2014, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV) or a hybrid electric vehicle (HEV) and an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a positive electrode current collector and a negative electrode current collector, a separator, an active material, and an electrolyte solution, and allows repeated charging and discharging by electrochemical reactions between the constituent elements.

Recently, with the growing need for a high-capacity structure as well as utilization as an energy storage source, there is an increase in demand for a battery pack of a multi-module structure in which a plurality of battery modules including a plurality of secondary batteries connected in series and/or in parallel are assembled.

Because a battery pack of a multi-module structure is designed to include a plurality of secondary batteries arranged with a high density in a narrow space, it is important to easily discharge heat generated from the respective secondary batteries. One of the various methods of discharging heat generated from a secondary battery, a cooling method using a coolant is disclosed in Korean Patent Application Publication No. 10-2013-0062056.

FIG. 1 is a diagram illustrating the design of a cooling channel 10 according to a related art.

Referring to FIG. 1, the cooling channel 10 for cooling a secondary battery is illustrated. A refrigerant flowing in the cooling channel 10 enters an inlet 11 and exits an outlet 12. In the cooling channel 10 of the above structure, the secondary battery is more cooled at the inlet 11 side and is less cooled at the outlet 12 side. That is, the farther from the inlet 11 and closer to the outlet 12 the location is, the higher the temperature of the coolant is, so the cooling efficiency reduces.

The above problem of the related art causes a temperature gradient of the secondary battery, and the temperature gradient of the secondary battery leads to a performance gradient of the secondary battery. Finally, it connects with performance deterioration of a system such as a battery pack including the secondary battery. Therefore, there is a need for the design of a cooling channel to provide a uniform cooling effect.

DISCLOSURE

Technical Problem

The present disclosure is designed to address the above issue of the related art, and therefore, the present disclosure is directed to providing a heat sink with two or more separated channels.

Technical Solution

To achieve the above object, a heat sink according to the present disclosure includes a cooling channel through which a refrigerant passes to cool a secondary battery by an indirect cooling method, the secondary battery including a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively, wherein the cooling channel has two or more separated channels, the two or more separated channels have branches inside to allow a coolant to flow in each of the channels, and the branches are vertically arranged.

In the present disclosure, the two or more channels separated by dividing an area of the heat sink into halves may be each designed to be responsible for half the cooling, and an overlapping part of the two or more channels may be formed in a multilayer structure by vertically arranging the branches.

In this instance, the area of the heat sink may be divided into a part close to the common inlet and a remaining part, and the branches may have a structure in which among the two or more separated channels, a channel for cooling the part close to the common inlet is placed lower and a channel for cooling the remaining part is placed higher. The channel for cooling the part close to the common inlet may provide a thermal insulation effect between the part close to the common inlet and the channel for cooling the remaining part.

The heat sink according to the present disclosure may be an element of an indirect secondary battery cooling apparatus including the heat sink and a cooling fin which comes into contact with one surface of the secondary battery.

The indirect secondary battery cooling apparatus according to the present disclosure may be an element of a battery module including the indirect secondary battery cooling apparatus and at least two secondary batteries.

The battery module according to the present disclosure may be an element of a battery pack including a plurality of battery modules and a battery management system which controls the charge and discharge of the battery modules.

The battery pack according to the present disclosure may be an element of a battery operating system including the battery pack and a load which is supplied with power from the battery pack. In this instance, the load may be an electrical drive means or a portable device.

Advantageous Effects

Two or more separated cooling channels according to the present disclosure have a shorter movement distance than a related art. Thus, as compared to the related art, a rate at which the temperature rises with the increasing distance from an inlet of the cooling channel is relatively low. That is, the problem of the related art, i.e., the cooling efficiency reduces with the increasing distance from the inlet of the cooling channel, may be solved.

According to the present disclosure, when branches are vertically arranged, an unnecessary temperature increase in a portion of coolant may be prevented.

According to the present disclosure, provision of a heat sink having a uniform cooling effect is enabled.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
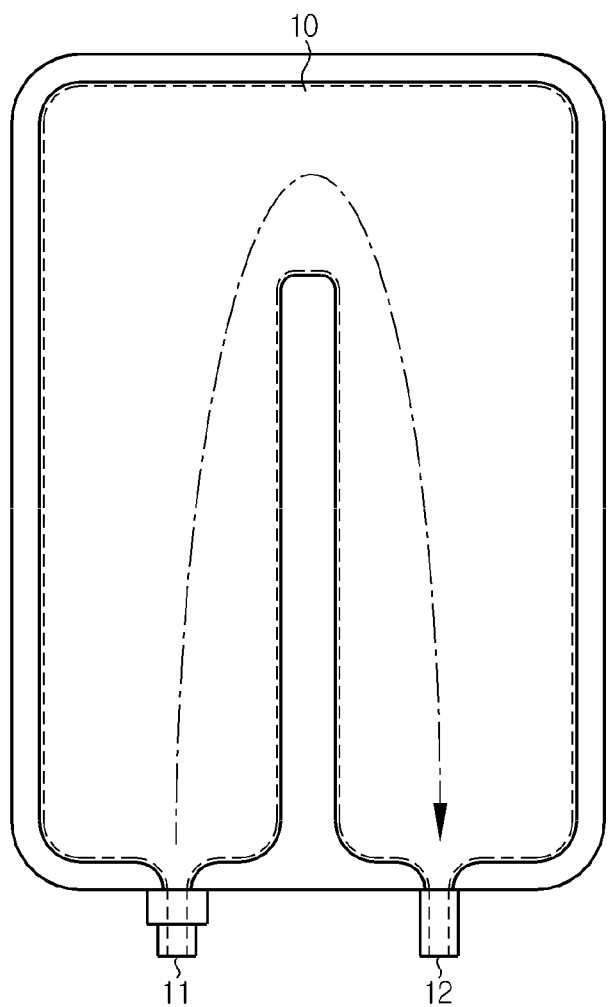
FIG. 1 is a diagram illustrating the design of a cooling channel according to a related art.
Figure 2:
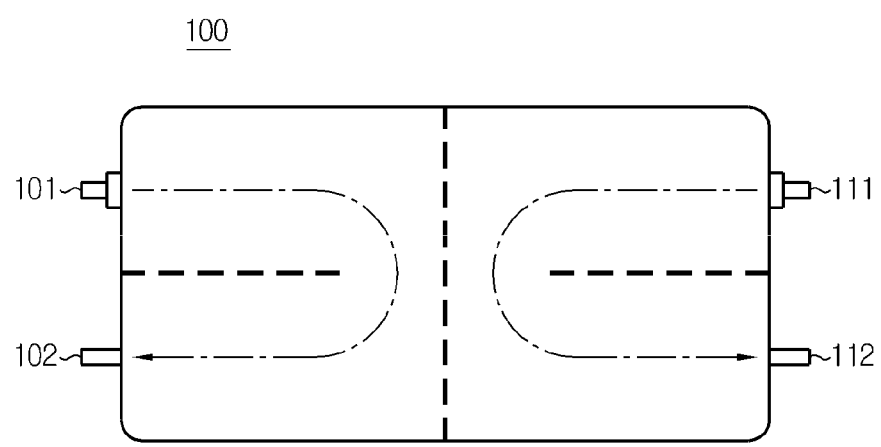
FIGS. 2 and 3 are cross-sectional views illustrating a heat sink with two or more separated cooling channels.
Figure 3:
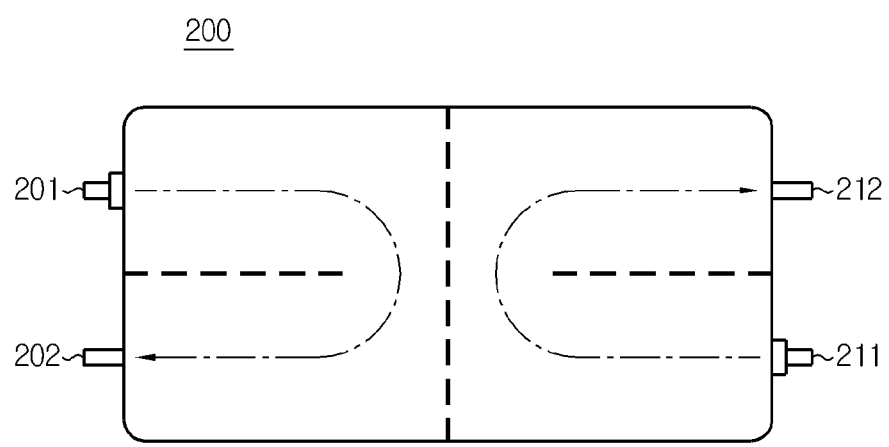

FIGS. 2 and 3 are cross-sectional views illustrating heat sinks 100 and 200 with two or more separated cooling channels.

The heat sink according to the present disclosure uses an indirect cooling method to cool a secondary battery. According to the indirect cooling method, heat generated from the secondary battery is transferred to a cooling fin by a contact between the surface of the secondary battery and the cooling fin. To dissipate the heat, the cooling fin is connected to a heat sink having a large surface area, and the heat is transferred from the cooling fin to the heat sink. Also, the heat sink is cooled by a coolant again. Thus, the indirect cooling method is a method which cools the secondary battery through the cooling fin and the heat sink, without requiring the coolant to directly pass through the secondary battery. In FIGS. 2 and 3, the cooling channel formed inside the heat sink should be understood from a cross sectional area of the heat sink.

In the heat sink 100 shown in FIG. 2, inlets 101 and 111 of the two or more cooling channels are formed at opposing locations with respect to the center of the heat sink 100. In this instance, outlets 102 and 112 of the cooling channels may be also formed at opposing locations with respect to the center of the heat sink 100.

In the heat sink 200 shown in FIG. 3, inlets 201 and 211 of the two or more cooling channels are formed at diagonal locations with respect to the center of the heat sink 200. In this instance, outlets 202 and 212 of the cooling channels may be also formed at diagonal locations with respect to the center of the heat sink heat sink 200.

Although FIGS. 2 and 3 show that a refrigerant flows in the cooling channel only one time for simplification of the drawings, it should be understood that the internal cooling channel may be variously formed.

The heat sinks 100 and 200 described with reference to FIGS. 2 and 3 are designed such that a heat sink area is divided into halves, a cooling channel is split into halves, and each channel covers half the cooling. As a channel length is half the channel length of a traditional heat sink, a maximum distance from the inlets 101 and 111 and 201 and 211 of the cooling channels to a point where heat is generated may be reduced by half. Furthermore, as an inflow of coolant flows in two halves, there is an advantage of reducing a loss of pressure in the same system.

As described above, dissimilar to a related art, the present disclosure features two or more separated cooling channels. The two or more separated cooling channels have a shorter movement distance than the related art. Thus, as compared to the related art, a rate at which the temperature rises with the increasing distance from an inlet of the cooling channel is relatively low. That is, the problem of the related art, i.e., the cooling efficiency reduces with the increasing distance from the inlet of the cooling channel, may be solved.

However, the heat sinks 100 and 200 shown in FIGS. 2 and 3 have the increasing number of cooling channel inlets and outlets with the increasing number of separated cooling channels. Accordingly, the number of connection points with a coolant supply device and an amount of work involved therein increases by as much.

Figure 4:
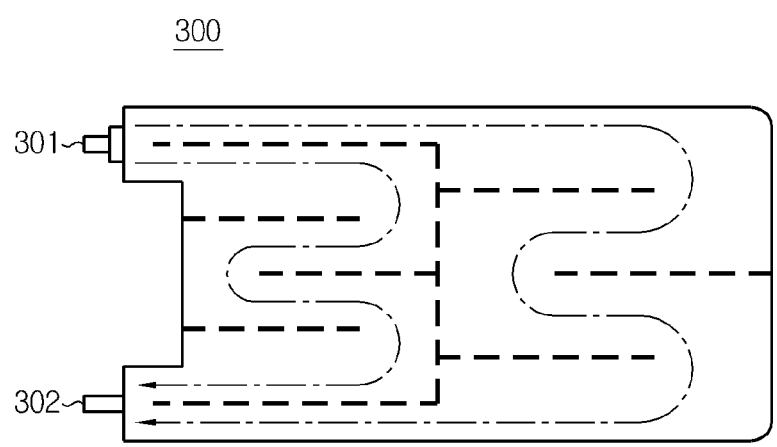
FIG. 4 is a cross-sectional view illustrating a heat sink with a common inlet and a common outlet.

FIG. 4 is a cross-sectional view illustrating a heat sink 300 with a common inlet and a common outlet.

Referring to FIG. 4, there are found a common inlet 301 and a common outlet 302 for channels, dissimilar to the embodiments of FIGS. 2 and 3. That is, the heat sink 300 shown in FIG. 4 is characterized in having a common inlet and a common outlet.

In the embodiments shown in FIGS. 2 and 3 above, a minimum of four or more connection points with a device for supplying coolant are necessary. As in the embodiment shown in FIG. 4, when the common inlet 301 and the common outlet 302 for channels are formed, the number of connection points with a device for supplying coolant reduces. Thus, assembling by an operator is facilitated and thus there is a reduction in the number of parts where a coolant will leak. In this instance, it should be understood that the cooling channels shown in FIG. 4 may be variously formed.

Figure 5:
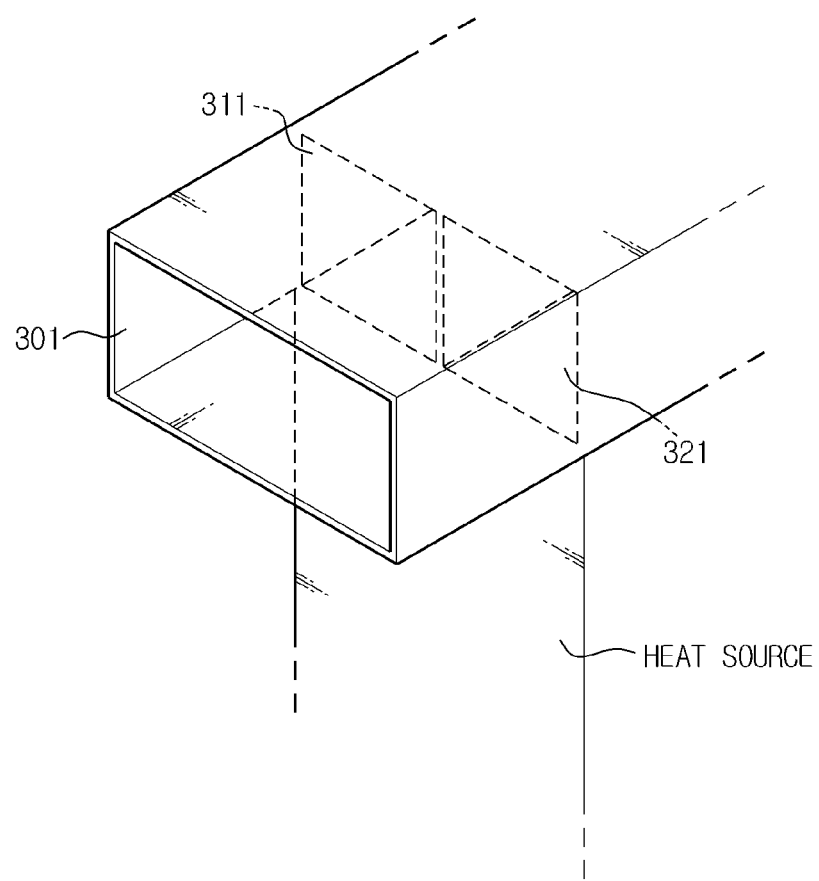
FIG. 5 is a see-through perspective view illustrating branches arranged horizontally inside channels.

In the case of the heat sink 300 with the common inlet and the common outlet, branches 311 and 321 may be arranged horizontally inside the channels as shown in FIG. 5.

Even channels with a common inlet and a common outlet as in the embodiment shown in FIG. 4 need branches inside the channels to allow a coolant to flow in two or more separated channels.

FIG. 5 is a see-through perspective view illustrating the branches 311 and 321 arranged horizontally inside the channels.

Referring to FIG. 5, the two or more separated channels have the branches 311 and 321 inside to allow a coolant to flow in each of the channels, and the branches 311 and 321 may be horizontally arranged.

However, a problem of the branches 311 and 321 arranged horizontally inside the channels is an unnecessary temperature increase in the coolant. Prior to the description, for convenience of understanding, assume that the branch indicated by the reference numeral 311 refers to a branch which induces the coolant to move to the channel on the right side among the channels shown in FIG. 4, and the branch indicated by the reference numeral 321 refers to a branch which induces the coolant to move to the channel on the left side among the channels shown in FIG. 4. If the internal structure of the horizontal arrangement as described above has the common inlet 301 and the common outlet 302, when the coolant in the channel connected to the reference numeral 321 is heated, the heat may be transferred to the coolant flowing in the channel connected to the reference numeral 311, and the channel connected to the reference numeral 311 also increases in temperature while passing through a left heat source part before passing through a right heat source, i.e., an object to be cooled disposed on the right side which is farther than the left heat source. Thus, the embodiment shown in FIG. 5 has a disadvantage in that the coolant in the channel on the right side is unnecessarily at a higher temperature because of having to go farther and turn back than that of the channel connected to the reference numeral 311, i.e., the channel on the left side.

Figure 6:
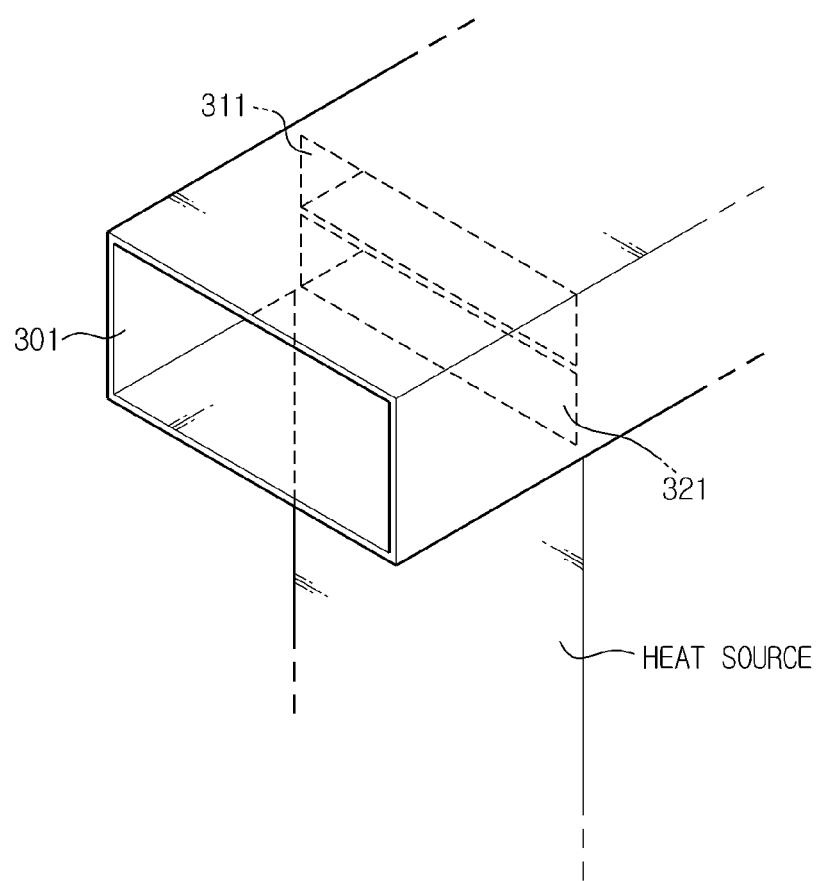
FIG. 6 is a see-through perspective view illustrating branches arranged vertically inside channels according to an exemplary embodiment of the present disclosure.

FIG. 6 is a see-through perspective view illustrating the branches arranged vertically inside the channels according to an exemplary embodiment of the present disclosure.

Referring to FIG. 6, the two or more separated channels have the branches 311 and 321 inside to allow the coolant to flow in each of the channels, and the branches 311 and 321 may be vertically arranged.

Assume that the branch indicated by the reference numeral 311 refers to a branch which induces the coolant to move to the channel on the right side among the channels shown in FIG. 4, and the branch indicated by the reference numeral 321 refers to a branch which induces the coolant to move to the channel on the left side among the channels shown in FIG. 4.

Figure 7:
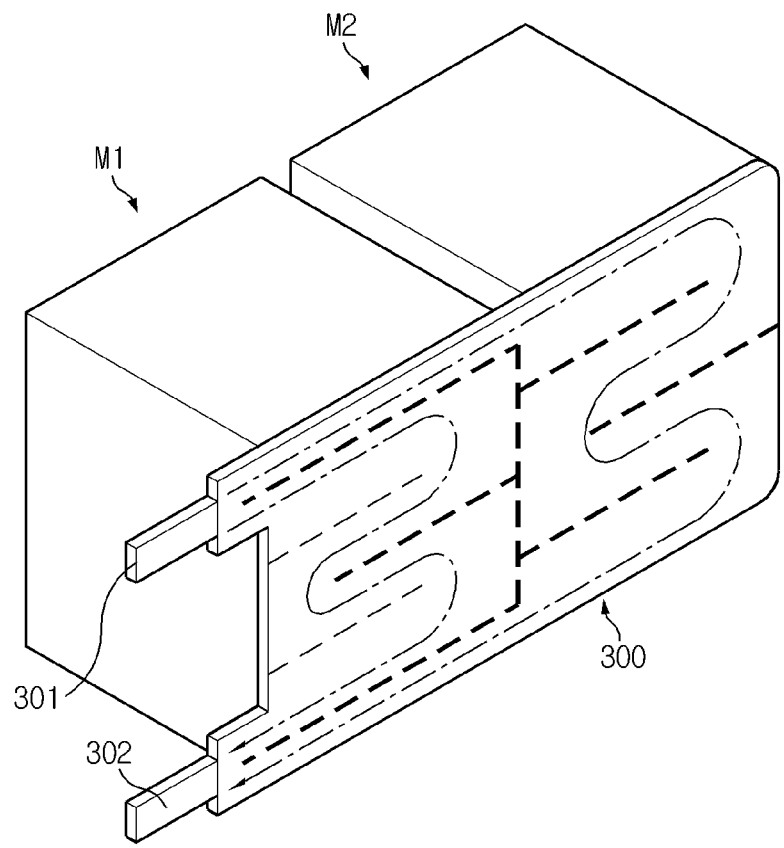
FIG. 7 illustrates uniform cooling by a heat sink with the channels of FIG. 6 on the side of two batteries placed in parallel.

The heat sink 300 with the channels of FIG. 6 may cool, for example, two batteries M1 and M2 placed in parallel as shown in FIG. 7 on the side, and for example, the same works for a battery module. The left channel of FIG. 4 connected to the reference numeral 321 may be responsible for cooling the battery M1 on the left side (also front side) among the two batteries M1 and M2, and the right channel of FIG. 4 connected to the reference numeral 311 may be responsible for cooling the battery M2 on the right side (also rear side) among the two batteries M1 and M2.

An example may be contemplated in which an overlapping part of the left channel of FIG. 4 connected to the reference numeral 321 and the right channel of FIG. 4 connected to the reference numeral 311 has a multilayer structure of vertical arrangement as shown in FIG. 6, and a non-overlapping part, i.e., a part where only the right channel of FIG. 4 connected to the reference numeral 311 is present, maintains a single layer.

When the internal structure has a two-layer vertical arrangement, although the common inlet 301 and the common outlet 302 are formed, the channel connected to the reference numeral 311 does not come into contact with the front battery M1. This is because the channel connected to the reference numeral 321 disposed between the channel connected to the reference numeral 311 and the front battery M1 provides a thermal insulation effect to prevent an initial temperature of the coolant flowing in the channel connected to the reference numeral 311 from increasing due to the front battery M1.

By maintaining the initial temperature of the coolant flowing in the channel connected to the reference numeral 311, the cooling performance of the rear battery M2 may be improved and equal cooling rates of the front battery M1 and the rear battery M2 may be achieved, reducing a temperature gradient between the batteries M1 and M2. Thus, in this embodiment, the coolant entering to cool the two batteries M1 and M2 is divided into an upper part and a lower part, so uniform cooling of the batteries placed in parallel is accomplished without interference, thereby providing a performance improvement effect for a battery module including the batteries.

In FIG. 6, the heat source disposed immediately below the reference numeral 321 is an object being cooled by the coolant flowing in the channel connected to the reference numeral 321, i.e., the front battery M1. Thus, as in the embodiment shown in FIG. 6, when the branches are vertically arranged, an unnecessary temperature increase in a portion of the coolant may be prevented. Although the above embodiment shows that a heat sink is disposed on the side of two batteries placed in parallel to cool the batteries, various embodiments may be enabled, provided uniform cooling is accomplished without coolant interference between two or more separated channels stacked vertically including a channel responsible for cooling a left part close to a common inlet and a channel responsible for cooling a remaining right part by dividing a heat sink area into halves, even in the case of one object being cooled, i.e., one heat source. Also, this vertical arrangement of a multilayer structure may be applied to a multilayer channel structure including a two-layer channel structure, and any shape is available with an internal channel in each layer.

Although FIG. 4 presents a heat sink with two separated channels as an example for convenience of understanding and simplification of the drawings, the heat sink according to the present disclosure may have two or more separated cooling channels as described above.

The heat sink according to the present disclosure may be an element of an indirect secondary battery cooling apparatus including the heat sink and a cooling fin in contact with one surface of a secondary battery.

The indirect secondary battery cooling apparatus according to the present disclosure may be an element of a battery module including the indirect secondary battery cooling apparatus and at least two secondary batteries.

The battery module according to the present disclosure may be an element of a battery pack including a plurality of battery modules and a battery management system which controls the charge and discharge of the battery modules.

The battery pack according to the present disclosure may be an element of a battery operating system including the battery pack and a load which is supplied with power from the battery pack.

The battery operating system may be, for example, an electric vehicle (EV), a hybrid electric vehicle (HEV), an electric bike, a power tool, an energy storage system, an uninterruptible power supply (UPS), a portable computer, a mobile phone, a portable audio player, or a portable video player, and the load may be a motor that generates a rotational force by power supplied from a battery pack, or a power inverter circuit that inverts power supplied from a battery pack to power required for various circuit components.

The heat sink according to the present disclosure does not limit the scope of the invention by the secondary battery being cooled. The secondary battery includes a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively.

The positive electrode plate is primarily made from aluminum. Alternatively, the positive electrode plate may be made from stainless steel, nickel, titanium, baked carbon, or aluminum or stainless steel treated with carbon, nickel, titanium, or silver on the surface. Further, the positive electrode plate is not limited to a particular material if it has a high conductivity while not causing a chemical change in the secondary battery.

The positive electrode tab is provided at a certain area of the positive electrode plate, and may extend from the positive electrode plate. Alternatively, the positive electrode tab may be formed by joining a member of a conductive material to a predetermined portion of the positive electrode plate, for example, through welding. Also, the positive electrode tab may be formed by coating and drying a positive electrode material on a certain area of a peripheral surface of the positive electrode plate.

The negative electrode plate corresponding to the positive electrode plate is primarily made from copper. Alternatively, the negative electrode plate may be made from stainless steel, aluminum, nickel, titanium, baked carbon, or copper or stainless steel treated with carbon, nickel, titanium, or silver on the surface, and aluminum-cadmium alloys may be also used.

The negative electrode tab is also provided at a certain area of the negative electrode plate, and similar to the positive electrode tab described above, may extend from the negative electrode plate, and the negative electrode tab may be formed by joining a member of a conductive material to a predetermined portion of the negative electrode plate, for example, through welding, and may be formed by coating and drying a negative electrode material on a certain area of a peripheral surface of the negative electrode plate.

The positive electrode lead is electrically connected to the positive electrode tab of the positive electrode plate, and the negative electrode lead is electrically connected to the negative electrode tab of the negative electrode plate. Preferably, the positive electrode lead and the negative electrode lead are joined with a plurality of positive electrode tabs and a plurality of negative electrode tabs, respectively.

The positive electrode plate and the negative electrode plate are coated with a positive electrode active material and a negative electrode active material, respectively. As an example, the positive electrode active material is a lithium-based active material, and as a typical example, may include metal oxide such as $LiCoO_2$, $LiNiO_2$, $LiMnO_2$, $LiMn_2O_4$, $LiFePO_4$, or $Li_{1+z}Ni_{1-x-y}Co_xM_yO_2$ ($0 \leq x \leq 1$, $0 \leq y \leq 1$, $0 \leq x+y \leq 1$, $0 \leq z \leq 1$, M denotes a metal such as Al, Sr, Mg, La, and Mn). The negative electrode active material is a carbon-based active material, and may include a carbon material such as crystalline carbon, amorphous carbon, carbon complex, and carbon fibers, lithium metals, and lithium alloys. The type and chemical composition of the positive electrode active material and the negative electrode active material may change based on the type of the secondary battery, and it should be understood that the above particular example is for illustration only.

The separator is not limited to a particular type, provided it is made from a porous material. The separator may be formed of a porous polymer membrane, for example, a porous polyolefin membrane, polyvinylidene fluoride-co-hexafluoropropylene, polyvinylidene fluoride-trichloroethylene, polymethylmetacrylate, polyacrylonitrile, polyvinylpyrrolidone, polyvinylacetate, ethylene vinyl acetate copolymer, polyethyleneoxide, cellulose acetate, cellulose acetate butylate, cellulose acetate propionate, cyanoethylpullulan, cyanoethylpolyvinylalcohol, cyanoethylcellulose, cyanoethylsucrose, pullulan, carboxyl methyl cellulose, acrylonitrile butadiene styrene copolymer, polyimide, polyethylene terephthalate, polybutylene terephthalate, polyester, polyacetal, polyamide, polyetheretherketone, polyethersulfone, polyphenylene oxide, polyphenylene sulfidro, polyethylene naphthalene, a non-woven membrane, a membrane having a porous web structure, or combinations thereof. Inorganic particles may be bound to one surface or both surfaces of the separator.

The inorganic particles are preferably inorganic particles having a high dielectric constant greater than or equal to 5, and more preferably, inorganic particles having a high dielectric constant greater than or equal to 10 and a low density. This facilitates the transfer of lithium ions moving in the battery. Non-limiting examples of inorganic particles having a high dielectric constant greater than or equal to 5 include $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$(PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, $Y_2O_3$, or mixtures thereof.

The cell assembly may have a simple stack structure of a plurality of unit cells with an insulating membrane interposed between the unit cells. As another example, the cell assembly may have a stack folding structure in which unit cells are arranged at an optimum interval on an upper surface and/or a lower surface of an insulating membrane and the insulating membrane is folded in one direction together with the unit cells, so the unit cells are inserted between the folded insulating membrane. As another example, the cell assembly may have a jelly roll structure formed by mounting, on an insulating membrane, a unit cell extending in the shape of a strand and continuously rolling up the unit cell and the insulating membrane together in one direction. The insulating membrane may be made from a material that may be employed as the separator. According to circumstances, the insulating membrane may be made from the same material membrane and/or with the same structure as the separator.

Hereinabove, the present disclosure has been described by limited embodiments and drawings, but the present disclosure is not limited thereto and it should be understood that various changes and modifications may be made by an ordinary person skilled in the art within the spirit and scope of the disclosure and the appended claims and their equivalents.

What is claimed is:

1. A heat sink comprising:
a bottom wall and a top wall spaced from the bottom wall in a vertical direction;
a first side wall extending between the top wall and the bottom wall, the bottom wall having a larger surface area than the first side wall;
two or more separated channels through which a refrigerant passes to cool a secondary battery by an indirect cooling method, the secondary battery comprising a cell assembly in which at least two unit cells are stacked, each unit cell comprising a positive electrode plate, a separator, and a negative electrode plate, and a plurality of positive and negative electrode tabs protruding from the positive and negative electrode plates of each unit cell is electrically connected to positive and negative leads, respectively,
an inlet in the first side wall for supplying coolant to the two or more separated channels;
an outlet in the first side wall for removing coolant from the two or more separated channels; and
a plurality of branches wherein each branch extends between the inlet and one of the two or more separated channels,
wherein the branches are arranged in the vertical direction relative to one another.

2. The heat sink according to claim 1, wherein the two or more channels separate the heat sink into halves including a first part close to the inlet and a second part further from the inlet than the first part.

3. The heat sink according to claim 2, a branch cooling the first part is placed lower than a branch cooling the second part.

4. A battery module comprising:
at least two secondary batteries comprising a first secondary battery and a second secondary battery next to the first secondary battery,
a heat sink, the heat sink comprising:
an inlet for allowing coolant into the heat sink and an outlet for removing coolant from the heat sink;
a heat transfer surface contacting the secondary batteries, the heat transfer surface having a first end and a second end;
a first cooling area located near the first end of the heat transfer surface and contacting the first secondary battery;
a first channel extending through the first cooling area;
a second cooling area located between the first cooling area and the second end of the heat transfer surface and contacting the second secondary battery;
a second channel extending through the second cooling area;
a first branch extending between the inlet and the first channel; and
a second branch extending between the inlet and the second channel,
wherein the first branch is between the heat transfer surface and the second branch.

5. A battery pack comprising:
a plurality of battery modules according to claim 4; and
a battery management system which controls the charge and discharge of the battery modules.

6. A battery operating system comprising:
a battery pack according to claim 5; and
a load which is supplied with power from the battery pack.

7. The battery operating system according to claim 6, wherein the load is an electrical drive means or a portable device.

* * * * *